US012557169B2

(12) United States Patent
Huang et al.

(10) Patent No.: US 12,557,169 B2
(45) Date of Patent: Feb. 17, 2026

(54) METHOD FOR SMALL DATA TRANSMISSION

(71) Applicant: ZTE Corporation, Guangdong (CN)

(72) Inventors: He Huang, Guangdong (CN); Zijiang Ma, Guangdong (CN); Wei Ma, Guangdong (CN); Chen Lu, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 322 days.

(21) Appl. No.: 18/340,129

(22) Filed: Jun. 23, 2023

(65) Prior Publication Data

US 2023/0337317 A1     Oct. 19, 2023

Related U.S. Application Data

(63) Continuation of application No. PCT/CN2020/138478, filed on Dec. 23, 2020.

(51) Int. Cl.
*H04W 76/27* (2018.01)
*H04W 76/30* (2018.01)

(52) U.S. Cl.
CPC .......... *H04W 76/27* (2018.02); *H04W 76/30* (2018.02)

(58) Field of Classification Search
CPC ..... H04W 76/27; H04W 76/30; H04W 76/22; H04W 28/12
See application file for complete search history.

(56) References Cited

U.S. PATENT DOCUMENTS

| 12,167,489 B2* | 12/2024 | Wang | H04W 8/00 |
| 2022/0104299 A1* | 3/2022 | Kim | H04W 48/20 |
| 2022/0225472 A1* | 7/2022 | Kim | H04W 76/30 |
| 2022/0232659 A1* | 7/2022 | Kim | H04W 76/27 |
| 2023/0051568 A1* | 2/2023 | Kim | H04W 74/0833 |
| 2023/0284315 A1* | 9/2023 | Wang | H04W 76/19 370/329 |
| 2023/0328811 A1* | 10/2023 | Kim | H04W 76/11 370/328 |
| 2023/0363054 A1* | 11/2023 | Laselva | H04W 74/004 |

FOREIGN PATENT DOCUMENTS

CN     102752795 A    10/2012
WO     WO 2018/214903 A1    11/2018
(Continued)

OTHER PUBLICATIONS

Decision to Grant of Oct. 10, 2024 for Application No. EP 20 966 343.4 dated Oct. 10, 2024 (2 pp.).
(Continued)

*Primary Examiner* — Will W Lin
(74) *Attorney, Agent, or Firm* — Crowell & Moring LLP

(57) ABSTRACT

A wireless communication method for use in an anchor node includes receiving, from a serving node, a context request associated with a wireless terminal and an indication for a small data transmission. A first message is transmitted to a serving node and includes configuration information of the small data transmission. A second message is received from the serving node comprising downlink information of the small data transmission. The small data transmission is then performed.

20 Claims, 9 Drawing Sheets

(56) References Cited

FOREIGN PATENT DOCUMENTS

| WO | WO 2020/087325 A1 | 5/2020 |
| WO | WO 2020/189958 A1 | 9/2020 |

OTHER PUBLICATIONS

Communication under Rule 71 (3) EPC for Application No. EP 20 966 343.4 dated Aug. 20, 2024 (8 pp.).

Extended European Search Report for Application No. EP 20 966 343.4 dated Oct. 27, 2023 (9 pages).

Qualcomm Incorporated; "Control Plane Aspects on NR Small Data Transmission;" R2-2010008; 3GPP TSG-RAN WG2 Meeting #112e; Nov. 13, 2020 (7 pp.).

Extended European Search Report and Opinion for Application No. EP 24 210 805.8 dated Feb. 28, 2025 (11 pp.).

CATT: "Analysis on SDT without context relocation", 3GPP Draft; R2-2009368, 3$^{rd}$ Generation Partnership Project (3GPP), Mobile Competence Centre; 650, Route des Lucioles; F-06921 Sophia-Antipolis Cedex; France, vol. RAN WG2, No. electronic; Nov. 2, 2020-Nov. 13, 2020, October 23, 2020, XP052362422, Retrieved from the Internet: URL:https://ftp.3gpp.org/tsg_ran/WG2_RL2/TSGR2_112-e/Docs/R2-2009368.zip,R2-2009368 Analysis of SDT without context relocation-final.docx (5 pp.).

ZTE Corporation et al.: "Context fetch and data forwarding for SDT", 3GPP Draft; R2-2009193, 3rd Generation Partnership Project (3GPP), Mobile Competence Centre; 650, Route des Lucioles; F-06921 Sophia-Antipolis, Cedex; France, vol. RAN WG2, No. eMeeting; Nov. 2, 2020-Nov. 13, 2020, October 22, 2020, XP051941257, Retrieved from the Internet: URL:https://ftp.3gpp.org/tsg_ran/WG2_RL2/TSGR2_112-e/Docs/R2-2009193.zip; R2-2009193_contextFetch.docx (11 pp.).

International Search Report and Written Opinion received for Application No. PCT/CN2020/138478 mailed Sep. 24, 2021 (8 pages).

Huawei; "Summary of Email Discussion: [95#28] [NR] Data Transmission in 'New State';" R2-166986; 3GPP TSG-RAN WG2 #95bis; Oct. 14, 2016 (18 pp.).

Samsung; "Comparison Between Active and Inactive State for Small Data Transmission from Energy Efficiency Perspective; R2-166538;" 3GPP TSG-RAN WG2 Meeting #95-BIS; Oct. 14, 2016 (6 pp.).

* cited by examiner

METHOD FOR SMALL DATA TRANSMISSION

PRIORITY

This application claims priority as a Continuation of PCT/CN2020/138478, filed on Dec. 23, 2020, entitled "A METHOD FOR SMALL DATA TRANSMISSION", published as WO 2022/133763 A1, the entirety of which is incorporated herein by reference.

TECHNICAL FIELD

This document is directed generally to wireless communications, and in particular to small data transmissions.

BACKGROUND

When a user equipment (UE) needs to transmit data to the network, the UE may be required to establish a connection with the network (e.g. entering a connected state) no matter what amount of data needs to be transmitted. Under such conditions, huge signal overhead may be wasted on transmissions of small amount of data. In order to avoid wasting the signal overhead, new radio (NR) supports that the UE transmits small amount of data in an inactive state (i.e. small data transmission (SDT)).

Regarding the SDT, the network may need to determine whether to relocate UE context to a network node currently serving the UE. If the network cannot immediately determine whether to relocate UE context or decides not to relocate the UE context, the SDT may be performed in a delayed manner or abnormally.

SUMMARY

This document relates to methods, systems, and devices for the SDT, and in particular to methods, systems, and devices for the SDT in a resume procedure.

The present disclosure relates to a wireless communication method for use in an anchor node. The method comprises receiving, from a serving node, a context request associated with a wireless terminal and an indication for a small data transmission, transmitting, to the serving node, a first message comprising configuration information of the small data transmission, receiving, from the serving node, a second message comprising downlink information of the small data transmission, and performing the small data transmission.

Various embodiments may preferably implement the following features. In some embodiments, the wireless terminal is in an inactive state or a connection management connected state.

In some embodiments, the small data transmission is characterized by at least one of the following features:
a packet size of 100 bytes,
a latency of 5 seconds to 30 minutes or 1 hour, or
a frequency of every minute and up to monthly.

In some embodiments, the small data transmission is defined according to 3GPP TR 25.705 V13.0.0.

In some embodiments, the first message is transmitted and the second message is received no later than transmitting a response message in response to the resume request.

In some embodiments, the response message comprises one of context information of the wireless terminal or a radio resource control release message.

In some embodiments, the first message is transmitted and the second message is received after transmitting a response message in response to the resume request, wherein the response message comprises a radio resource control release message.

In some embodiments, the configuration information comprises at least one of an uplink address of the small data transmission or a radio link control configuration of the small data transmission.

In some embodiments, the downlink information comprises a downlink cell group transport network layer address.

In some embodiments, the performing the small data transmission comprises receiving, from a user plane function, downlink data of the wireless terminal, and transmitting, to the serving node, the downlink data.

In some embodiments, the performing the small data transmission comprises receiving, from the serving node, uplink data of the wireless terminal, and transmitting, to a user plane function, the uplink data.

The present disclosure relates to wireless communication method for use in a serving node. The method comprises:
transmitting, to an anchor node, a context request associated with a wireless terminal and an indication for a small data transmission,
receiving, from the anchor node, a first message comprising configuration information of the small data transmission,
transmitting, to the anchor node, a second message comprising downlink information of the small data transmission, and
performing the small data transmission.

Various embodiments may preferably implement the following features. In some embodiments, the wireless terminal is in an inactive state or a connection management connected state.

In some embodiments, the small data transmission comprises is characterized by at least one of the following features:
a packet size of 100 bytes,
a latency of 5 seconds to 30 minutes or 1 hour, or
a frequency of every minute and up to monthly.

In some embodiments, the small data transmission is defined according to 3GPP TR 25.705 V13.0.0.

In some embodiments, the first message is received and the second message is transmitted no later than receiving a response message in response to the resume request.

In some embodiments, the response message comprises one of context information of the wireless terminal or a radio resource control release message.

In some embodiments, the first message is received and the second message is transmitted after receiving a response message in response to the resume request, wherein the response message comprises a radio resource control release message.

In some embodiments, the configuration information comprises at least one of an uplink address of the small data transmission or a radio link control configuration of the small data transmission.

In some embodiments, the downlink information comprises a downlink cell group transport network layer address.

In some embodiments, the wireless communication method further comprises establishing radio link control entities for the small data transmission based on the configuration information, or determining an uplink address of the small data transmission based on the configuration information.

In some embodiments, the performing the small data transmission comprises receiving, from the anchor node, downlink data of the wireless terminal, and transmitting, to the wireless terminal, the downlink data.

In some embodiments, the performing the small data transmission comprises receiving, from the wireless terminal, uplink data, and transmitting, to the anchor node, the uplink data.

The present disclosure relates to an anchor node. The anchor node comprises: a communication unit, configured to: receive, from a serving node, a context request associated with a wireless terminal and an indication for a small data transmission, transmit, to the serving node, a first message comprising configuration information of the small data transmission, and receive, from the serving node, a second message comprising downlink information of the small data transmission, and a processor, configured to perform the small data transmission.

Various embodiments may preferably implement the following features. In some embodiments, the processor is further configured to perform any one of aforementioned wireless communication method.

The present disclosure relates to a serving node. The serving node comprises: a communication unit, configured to: transmit, to an anchor node, a context request associated with a wireless terminal and an indication for a small data transmission, receive, from the anchor node, a first message comprising configuration information of the small data transmission, and transmit, to the anchor node, a second message comprising downlink information of the small data transmission, and a processor, configured to perform the small data transmission.

Various embodiments may preferably implement the following features. In some embodiments, the processor is further configured to perform any one of aforementioned wireless communication method.

The present disclosure relates to a computer program product comprising a computer-readable program medium code stored thereupon, the code, when executed by a processor, causing the processor to implement a wireless communication method recited in any one of foregoing methods.

The example embodiments disclosed herein are directed to providing features that will become readily apparent by reference to the following description when taken in conjunction with the accompany drawings. In accordance with various embodiments, example systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the example embodiments and applications described and illustrated herein. Additionally, the specific order and/or hierarchy of steps in the methods disclosed herein are merely example approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

BRIEF DESCRIPTION OF THE DRAWINGS

The above and other aspects and their implementations are described in greater detail in the drawings, the descriptions, and the claims.

DETAILED DESCRIPTION

In the present disclosure, a small data transmission (SDT) may be a data transmission performed for (or by) the UE in an inactive state (e.g. radio resource control (RRC) inactive state (RRC_INACTIVE)) or a connection management (CM) connected (CM-CONNECTED) state. The SDT may be performed in a random access procedure or a(n) (RRC) resume procedure. In an embodiment, fundamental characteristics of the SDT may comprise at least one of:

a(n) (application) packet size of 100 bytes for uplink (UL) and 100 bytes for downlink (DL);

latency of 5 seconds to 30 minutes; 1 hour for no mobility scenario;

frequency of every minute and up to monthly.

The latency of the SDT is a duration from the packet of the SDT arriving at the buffer until the packet is completely transmitted. According to an embodiment, the small data transmission is further specified in 3GPP TR 25.705 V13.0.0.

Figure 1:
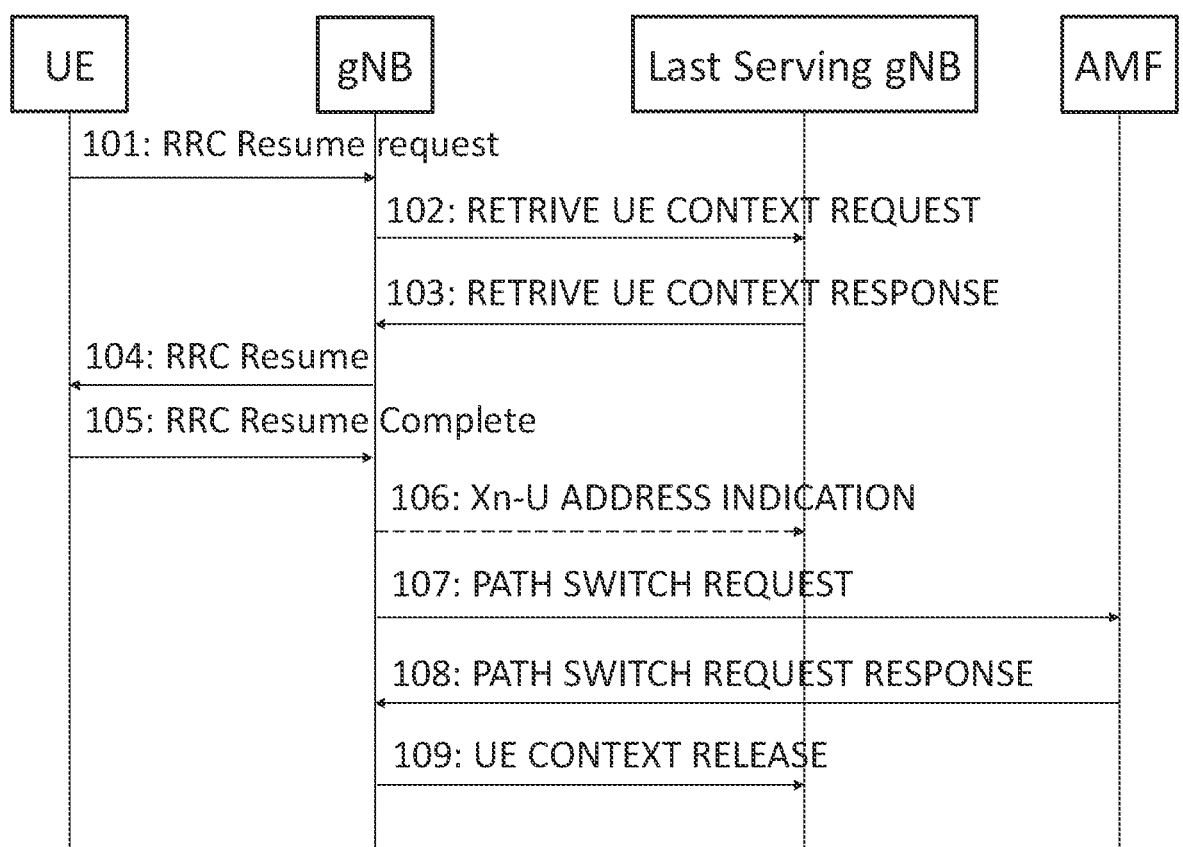
FIG. 1 shows a schematic diagram of a radio resource control resume procedure according to an embodiment of the present disclosure.

FIG. 1 relates to an RRC resume procedure with anchor relocation according to an embodiment of the present disclosure. In this embodiment, the UE context is transferred from an anchor gNB (e.g. the last serving gNB) to a current serving gNB (e.g. receiving gNB), a path switch procedure is performed after the UE context is fetched and the serving gNB becomes the new anchor gNB after the anchor relocation (e.g. the relocation of the UE context).

In the present disclosure, the gNB may be equal to a wireless network node, a radio access network (RAN) node, a next generation (NG) RAN node, an evolved Node B (eNB), or an NG-eNB.

More specifically, the UE is in an inactive state (e.g. RRC INACTIVE) and/or in the CM-CONNECTED state. In the beginning of the RRC resume procedure, the UE resumes from the inactive state and sends an RRC resume request (message) to a gNB (e.g. serving gNB or receiving gNB), for providing an inactive identifier (e.g. inactive radio network temporary identifier (I-RNTI)) allocated by the last serving gNB and a cause value. The cause value indicates a cause (e.g. reason, purpose) of sending the RRC resume request. For example, the cause value may indicate an RAN notification area (RNA) update (step 101).

In step 102, the gNB, if able to resolve an identity (e.g. associated with the last serving gNB) contained in the inactive identifier, requests the last serving gNB to provide UE context, e.g. by providing the cause value received in step 101.

In step 103, the last serving gNB provides the UE context in a response message (e.g. RETRIEVE UE CONTEXT RESPONSE).

In step 104, the gNB transmits an RRC resume message to keep the UE in the inactive state.

In step 105, the UE transmits an RRC resume complete message to the gNB.

In step 106, if loss of downlink (DL) user data buffered in the last serving gNB shall be prevented, the gNB provides forwarding addresses to the last serving gNB.

In steps 107 and 108, the gNB performs a path switch procedure with an access and mobility management function (AMF).

In step 109, the gNB triggers a release of the UE resources at the last serving gNB.

Figure 2:
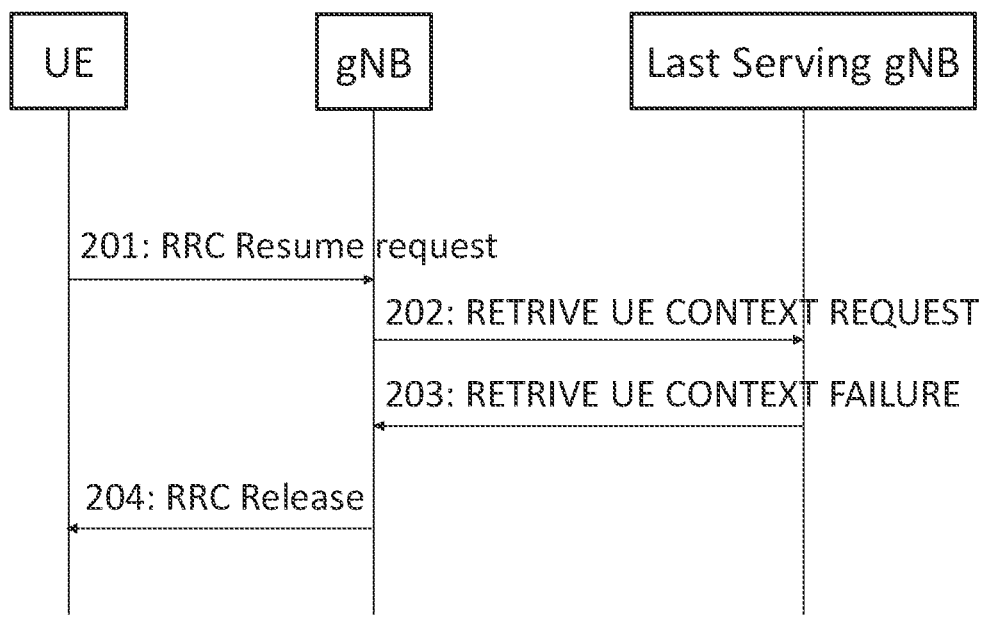
FIG. 2 shows a schematic diagram of a radio resource control resume procedure according to an embodiment of the present disclosure.

FIG. 2 relates to an RRC resume procedure without the anchor relocation according to an embodiment of the present disclosure. Note that, the RRC resume procedure without the anchor relocation may only be used for the RNA update.

In detail, the UE resumes from the inactive state (e.g. RRC_INACTIVE) by sending an RRC resume request (message) to the gNB and providing the I-RNTI allocated by the last serving gNB and the appropriate cause value, e.g., indicating the RNA update (step 201).

In step 202, the gNB, if able to determine the gNB identity contained in the I-RNTI, requests the last serving gNB to provide the UE context by providing the cause value received in step 201.

In Step 203, the last serving gNB stores the received information to be used in the next resume attempt (e.g. cell RNTI (C-RNTI) and physical cell identifier (PCI) related to a resumption cell), and responds to the gNB with the a failure message (e.g. RETRIEVE UE CONTEXT FAILURE message) including an encapsulated RRC release message. In an embodiment, the RRC release message includes a suspend indication.

In step 204, the gNB forwards the RRC release message to the UE.

In the RRC resume procedure, since the serving gNB may not be able to identify the anchor gNB based on the short I-RNTI, the serving gNB may send the context request message (e.g. Retrieve UE Context Request message) to multiple potential anchor gNBs. Considering the context request message can only be verified by the corresponding anchor gNB and only the anchor gNB has the UE context, it is up to the anchor gNB to determine whether the anchor relocation (i.e. the relocation of the UE context) is needed or not.

For achieving the SDT, different considerations may need to be thought over in the RRC resume procedure. For example, the RRC resume procedure without anchor relocation can only be applied for the RNA update. That is, the SDT may be delayed or may not be performed during the RRC resume procedure without the anchor relocation.

In the following, the receiving gNB may be equal to a receiving node and/or the gNB shown in FIGS. 1 and 2. The anchor gNB may be equal to an anchor node and/or the last serving gNB shown in FIGS. 1 and 2. In addition, uplink (UL) data in the following paragraphs is UL data for the SDT and DL data in the following paragraphs is DL data for the SDT.

Figure 3:
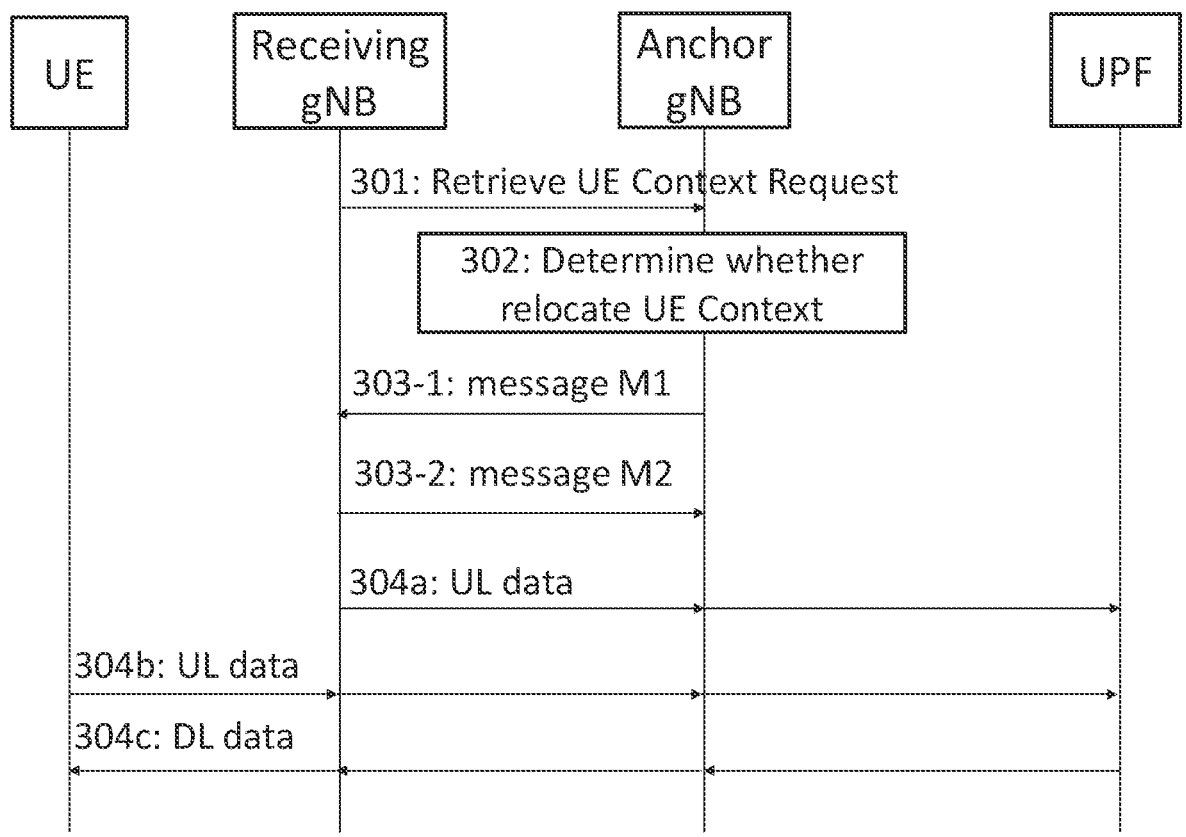
FIG. 3 shows a schematic diagram of a signaling procedure according to an embodiment of the present disclosure.

FIG. 3 shows a schematic diagram of a signaling procedure according to an embodiment of the present disclosure. In the signaling procedure shown in FIG. 3, the receiving gNB transmits a context request message (e.g. "Retrieve UE Context Request" message) for the UE context to the anchor gNB. In this embodiment, the context request message is associated with the SDT. For example, the context request message may include (e.g. indicate) a cause or a cause value associated with the SDT. In an embodiment, the cause or the cause value may be (associated with) an SDT indicator or multiple-SDT indicator.

In step 302, after receiving the context request message associated with the SDT, the anchor gNB determines (e.g. decides) whether to relocate the UE context to the receiving gNB. In this embodiment, the anchor gNB may determine whether to relocate the UE context in a later stage. As an alternative or in addition, the anchor gNB may determine not to relocate the UE context.

In the embodiment of the anchor gNB determining whether to relocate the UE context in the later stage or the anchor gNB determining not to relocate the UE context, the anchor gNB performs (e.g. initiate) a signaling procedure with the receiving gNB (i.e. steps 303-1 and 303-2).

More specifically, the signaling procedure is initiated by the anchor gNB and is used to establish tunnel(s) between the anchor gNB and the received gNB. For example, via the signaling procedure, the anchor gNB may establish UE radio link control (RLC) context at the receiving gNB and to configure UL/DL transport network layer (TNL) address(es) between the receiving gNB and the anchor gNB for the UL/DL data transmissions (e.g. UL/DL packet data convergence protocol (PDCP) packet data unit (PDU) packet transmissions).

In an embodiment, the signaling procedure may be named SDT RLC context transfer procedure or SDT RLC entity establish procedure.

In steps 303-1 and 303-2, when anchor gNB initiates the signaling procedure, the anchor gNB firstly sends a message M1 (e.g. SDT RLC context transfer request (message) or SDT RLC entity establish request (message)) to the receiving gNB. Next, the receiving gNB sends a message M2 (e.g., SDT RLC context transfer response, or SDT RLC entity establish response) to the anchor gNB.

In an embodiment, the message M1 includes at least one of the following information (the information may be named RLC context for the SDT):
1) UL PDCP TNL address for the SDT
2) RLC configuration for the SDT In an embodiment, the message M2 includes DL cell group (CG) TNL address for the SDT.

In the signaling procedure, the receiving gNB may perform at least one of the following actions:
1) acquiring RLC configuration information for the SDT.
2) establishing RLC entities for the SDT.
3) acquiring UL PDCP TNL address for the SDT.
4) sending DL CG TNL address for the SDT to anchor gNB.

In the signaling procedure, the anchor gNB may execute at least one of the following actions:
1) acquiring DL CG TNL address for the SDT from the receiving gNB.
2) sending UL PDCP TNL address for the SDT to the receiving gNB.

After completing the signaling procedure, the receiving gNB is able to transmit the UL data or receive the DL data via the anchor gNB. For example, the receiving gNB may perform at least one of steps 304a, 304b and 304c.

In step 304a, the receiving gNB transmits the UL data of the UE to the anchor gNB or the user plane function (UPF) via the anchor gNB, wherein the UL data may be received and buffered before the signaling procedure (e.g. in step 301) completes.

In step 304b, the receiving gNB receives the UL data for the SDT (e.g. PDU packets) from the UE and transmits the received UL data (e.g. PDCP PDU packets, or RLC SDU packets) for the SDT to the anchor gNB or the UPF via the anchor gNB.

In step 304c, the receiving gNB receives the DL data (e.g. PDCP PDU packets, or RLC SDU packets) for the SDT from the anchor gNB or the UPF via the anchor gNB and transmits the received DL data to the UE.

In an embodiment, after the anchor gNB receiving the context request message (e.g. Retrieve UE context Request message) associated with the SDT from the receiving gNB, the anchor gNB will decide whether and when to relocate the UE context. For example, the anchor gNB may have the following options:
Option 1: deciding to immediately relocate the UE context from itself to receiving gNB.
Option 2: deciding whether to relocate the UE context later (i.e. in the later stage).
Option 3: deciding not to relocate the UE context.

The resume procedures corresponding to these 3 options are illustrated in the following.

Figure 4A:
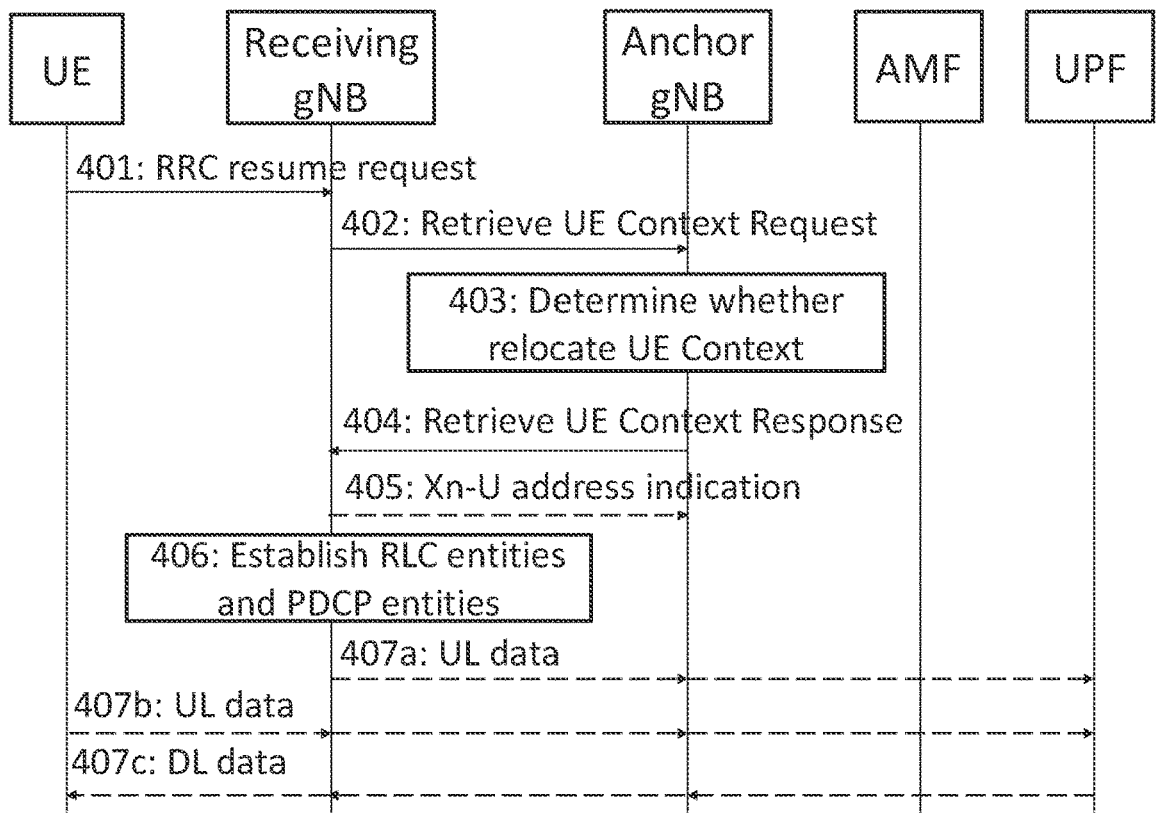
FIGS. 4A and 4B show schematic diagrams of an RRC resume procedure according to an embodiment of the present disclosure.
Figure 4B:
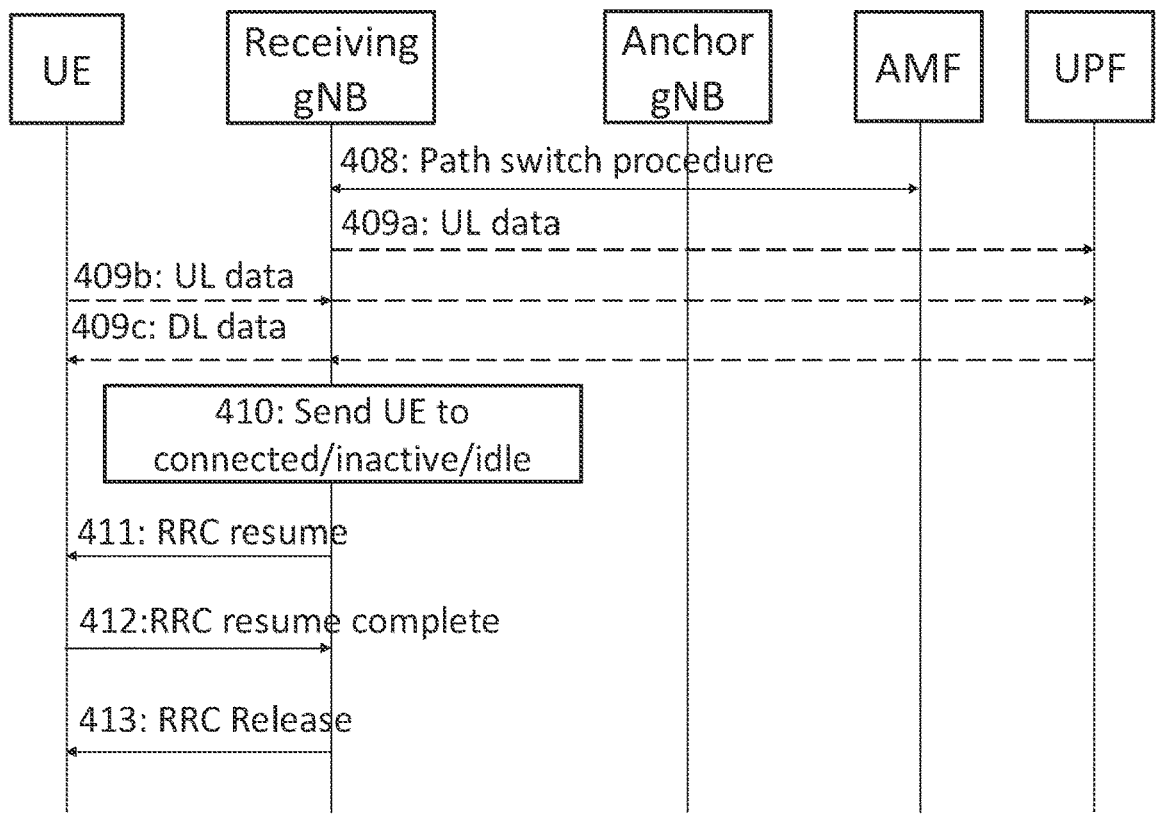

FIGS. 4A and 4B show a schematic diagram of an RRC resume procedure according to an embodiment of the present disclosure. In this embodiment, the anchor gNB may decide to immediately relocate the UE context (i.e. the above Option 1) after receiving the context request message from the receiving gNB.

More specifically, the UE in the inactive state transmits an RRC message (e.g. RRC Resume Request message) to the receiving gNB (step 401 in FIG. 4A). In an embodiment, the UE may transmit UL data of the SDT along with this RRC message and the transmitted UL data is buffered by the receiving gNB.

In step 402, the receiving gNB sends a context request message (e.g. "Retrieve UE Context request" message) including the SDT indicator to the anchor gNB. In an embodiment, the context request message may further include a DL CG TNL address for the SDT to anchor gNB In step 403, the anchor gNB decides to relocate UE context.

In step 404, the anchor gNB sends a context response message (e.g. "Retrieve UE Context response" message) including the UE context to the receiving gNB.

In step 405, the receiving gNB sends an Xn-U address indication message to the anchor gNB (Optional).

In step 406, the receiving gNB acquires the UE context and establishes RLC entities and PDCP entities based on the UE context.

Via the established RLC entities and PDCP entities, the receiving gNB may optionally perform steps 407a and/or 407b and/or 407c before initiating a path switch procedure.

In step 407a, the receiving gNB transmits buffered UL data (e.g. the UL data received in Step 402), if any, to the UPF via the anchor gNB.

In step 407b, the receiving gNB transmits subsequent UL data to the UPF via the anchor gNB when receiving the subsequent UL data from the UE.

In step 407c, the receiving gNB transmits DL data (i.e., DL RLC SDU) to the UE if receiving the DL data from the UPF via the anchor gNB.

In step 408 shown in FIG. 4B, the receiving gNB initiates the path switch procedure with the core network (e.g., 5G core network (5GC) or the AMF (i.e. one 5GC entity)).

After completing the path switch procedure, the receiving gNB may transmit buffered UL data, if any, (step 409a) and/or transmit the UL data to the UPF when receiving the UL data from the UE (step 409b), and/or send DL data to the UE when receiving the DL data from the UPF (step 409c).

In step 410, the receiving gNB may determine to send the UE to one of the RRC connected state, the RRC inactive state or the idle state.

If the receiving gNB determines sending the UE to the RRC connected state, the receiving gNB transmits an RRC resume message (step 411) and the UE feedbacks an RRC resume complete message (step 412). The UE enters in the RRC connected state after the steps 411 and 412.

If determining sending the UE to the RRC inactive state, the receiving gNB sends an RRC release message with a suspend indication (step 413). After receiving the RRC release message, the UE enters to the RRC inactive state.

Figure 5A:
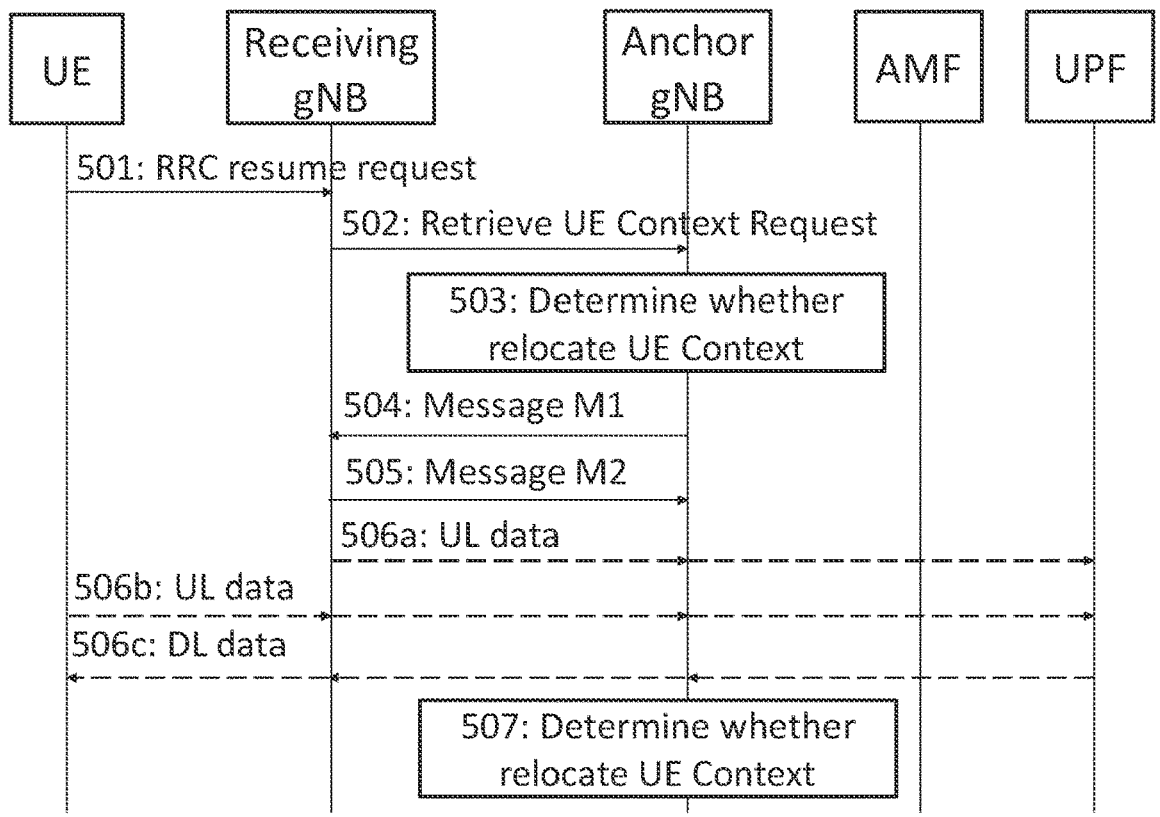
FIGS. 5A and 5B show schematic diagrams of a resume procedure according to an embodiment of the present disclosure.
Figure 5B:
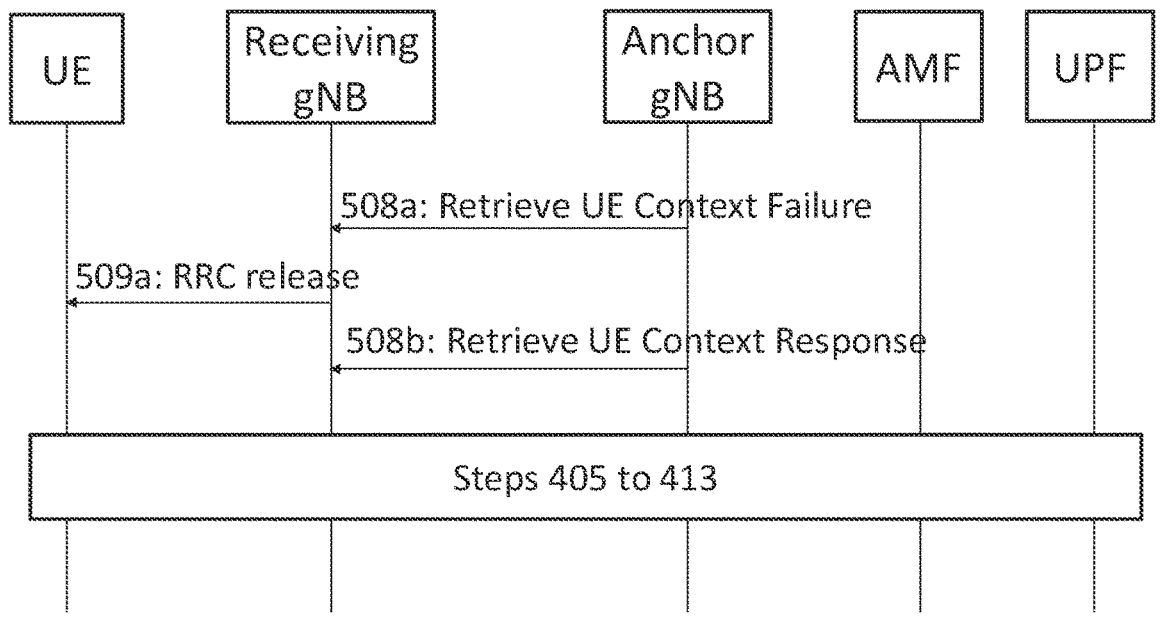

FIGS. 5A and 5B show a schematic diagram of a resume procedure according to an embodiment of the present disclosure. In this embodiment, the anchor gNB may decide to determine whether to relocate the UE context in the later stage or not to relocate the UE context (i.e. the above Options 2 and 3) after receiving the context request message from the receiving gNB.

More specifically, the UE in the inactive state transmits an RRC message (e.g. RRC Resume Request message) to the receiving gNB (step 501 in FIG. 5A). In an embodiment, the UE may transmit UL data of the SDT along with this RRC message and the transmitted UL data is buffered by the receiving gNB.

In step 502, the receiving gNB sends a context request message (e.g. "Retrieve UE Context request" message) including the SDT indicator to the anchor gNB. In an embodiment, the context request message may further include a DL CG TNL address for the SDT to the anchor gNB In step 503, the anchor gNB decides to determine whether to relocate the UE context in the later stage. As an alternative, the anchor gNB decides not to relocate the UE context and transmits the Retrieve UE context Failure message to the receiving gNB.

In steps 504 and 505, the anchor gNB performs the signaling procedure between the anchor gNB and the receiving gNB when deciding not to relocate the UE context or deciding to determine whether to relocate the UE context in the later stage. In detail, the anchor gNB firstly sends a message M1 (e.g. request message) to receiving gNB, wherein the message M1 includes the RLC configuration (e.g. for SDT) and/or the UL PDCP TNL address (e.g. for SDT) (step 504). Next, the receiving gNB sends a message M2 (e.g. response message) to the anchor gNB, wherein the message M2 includes the DL CG TNL address (e.g. for SDT).

After the signaling procedure, the receiving gNB may perform at least one of the following actions:
- transmitting, to the anchor gNB, buffered UL data packets (e.g. those received in step 501), if any (step 506a);
- transmitting, to the anchor gNB, subsequent UL data when receiving the UL data from the UE (step 506b);
- transmitting, to the UE, subsequent DL data if receiving the DL data from the anchor gNB (step 506c).

On the other hand, the anchor gNB may perform at least one of the following actions after the signaling procedure completes:
- transmitting, to the UPF, UL data (i.e., UL PDU packets) if receiving from the receiving gNB (step 506a and/or step 506b);
- transmitting, to the receiving gNB, DL data (i.e. DL PDU packets) if receiving from the UPF.

Note that, the UL data and/or the DL data may be transmitted and/or received in PDCP PDU packets, which is also called RLC SDU, between the receiving gNB and the anchor gNB.

If the anchor gNB does not determine whether to relocate the UE context in step 503, the anchor gNB may determine whether to relocate the UE context in step 507.

In an embodiment, the anchor gNB decides not to relocate the UE context in step 507 and sends the Retrieve UE context Failure message to the receiving gNB, wherein the Retrieve UE context Failure message comprises RRC release message (step 508a). The receiving gNB then transmits the RRC release message to the UE, to instruct the UE to enter the inactive state (step 509a).

Note, when the anchor gNB determines not to relocate the UE context in step 503, the anchor gNB and the receiving gNB would perform steps 504 to 506c and the receiving gNB may transmit the RRC release message (step 509a) after determining that there is not subsequent UL/DL data from the UE. In this scenario, the Retrieve UE context Failure message including the RRC release message may be sent before step 509a and/or after step 503.

If the anchor gNB determines to relocate the UE context in step 507, the anchor gNB transmits the Retrieve UE context response message including the UE context to the receiving gNB (step 508b). The procedure following step 508b can be referred to steps 405 to 413 shown in FIG. 4.

FIGS. 6A, 6B, 6C and 6D show a flowchart of a resume procedure according to an embodiment of the present disclosure. The procedure shown in FIGS. 6A, 6B, 6C and 6D may be used in a receiving gNB (e.g. that shown in FIGS. 4A, 4B, 5A and 5B) and comprises the following steps.

Figure 6A:
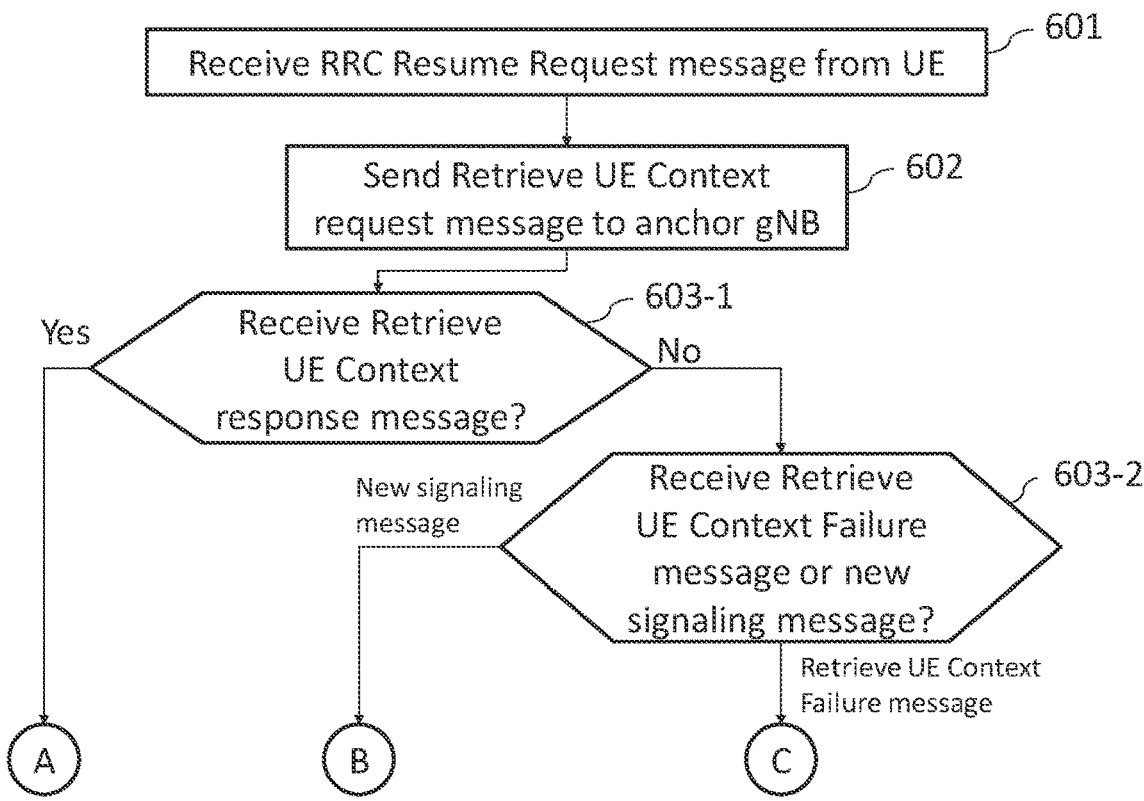
FIGS. 6A, 6B, 6C and 6D show a flowchart of a resume procedure according to an embodiment of the present disclosure.

In step 601 of FIG. 6A, the receiving gNB receives an RRC Resume Request message from the UE. In an embodiment, the receiving gNB may also receive UL data of the SDT from the UE in step 601.

In step 602, the receiving gNB sends a Retrieve UE Context request message to an anchor gNB. The Retrieve UE Context request message includes an SDT indictor, and optionally includes the SDT DL CG TNL address.

Figure 6B:
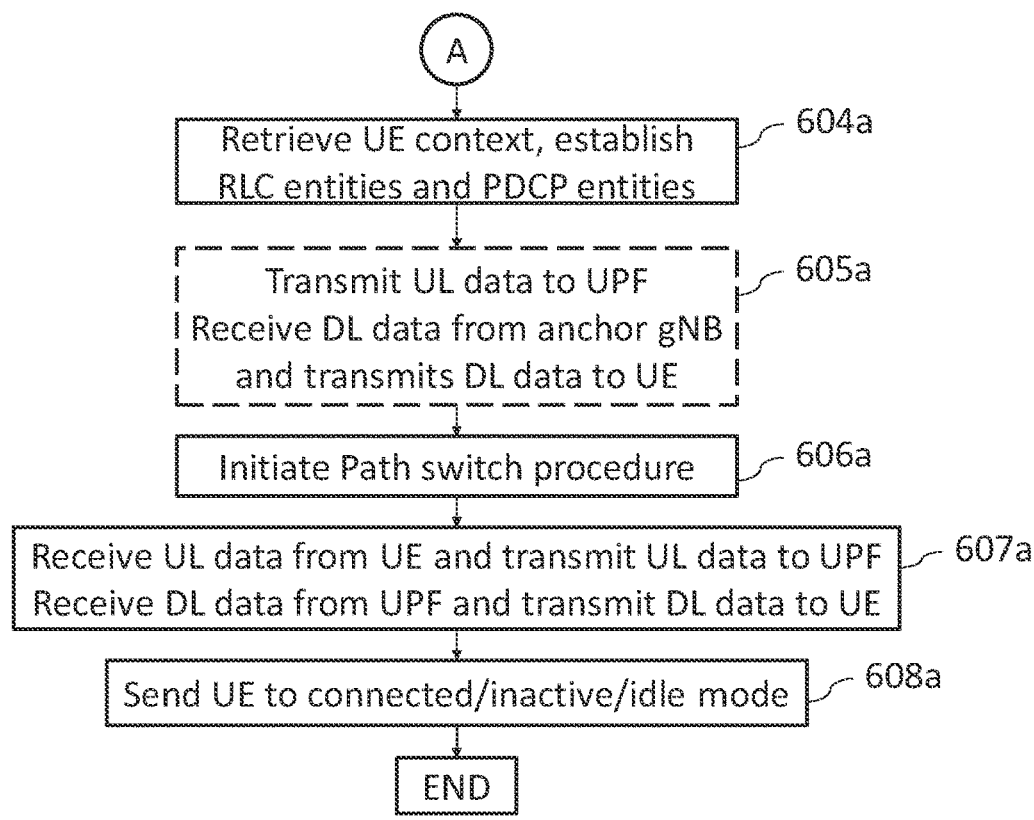

In step 603-1, if the receiving gNB receives, a Retrieve UE Context Response message, from the anchor gNB, step 604a shown in FIG. 6B would be performed; otherwise step 603-2 is performed. In step 603-2, if a signaling message (e.g. message M1) is received, step 604b is performed. In addition, if the receiving gNB receives a Retrieve UE Context Failure message from anchor gNB, step 604c is performed.

In step 604a (FIG. 6B), the receiving gNB acquires UE context (e.g. in the Retrieve UE Context Response message), establishes radio link control (RLC) entities and PDCP entities, optionally acquires SDT UL PDCP TNL address.

Optionally, step 605a is performed. In step 605a, before initiating a path switch procedure, the receiving gNB transmits (buffered) UL data, if any, to the UPF and/or receives DL data, if any, from anchor gNB and transmits the received DL data to the UE.

Note that, the UL data sent to the UPF is in UL SDT PDU packets. The DL data received from the anchor gNB is in DL SDT PDCP PDU packets. The DL data sent to the UE is in DL SDT PDU packets.

In step 606a, the receiving gNB initiate the path switch procedure (e.g. with the AMF).

In step 607a, the receiving gNB receives subsequent UL data from the UE, if any, and transmits buffered UL data, if any, and the subsequent UL data, if any, to the UPF. In addition, the receiving gNB receives subsequent DL data from the UPF, if any, and transmits the received subsequent data to the UE.

In step 608a, the receiving gNB sends the UE to one of the RRC connected state, the RRC inactive state or the RRC idle state. The procedure ends after step 608a.

Figure 6C:
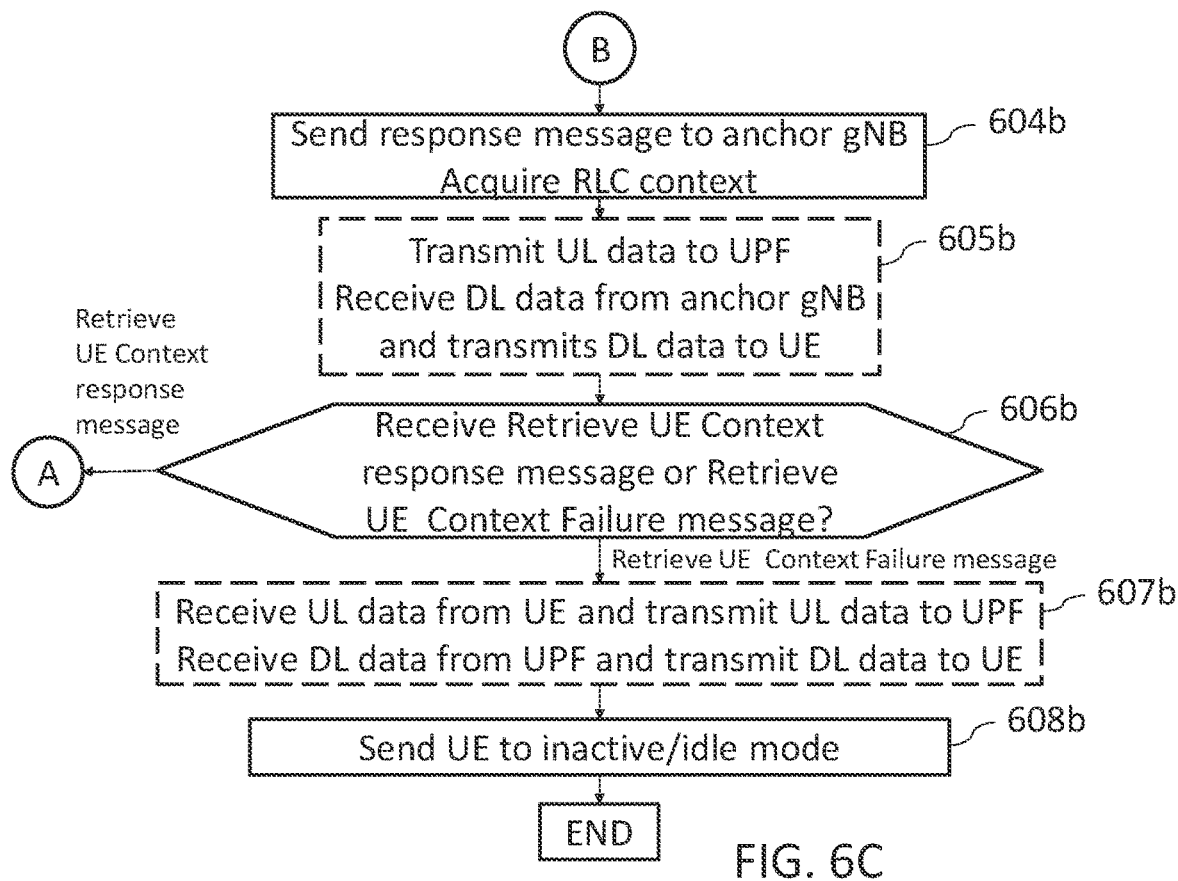

In step 604b of FIG. 6C, the receiving gNB acquires the RLC context (at least for the SDT), establishes RLC entities (at least for SDT usage) based on the received signaling message (i.e. the message M1) and sends a message M2 to the anchor gNB, wherein the message M2 includes SDT DL CG TNL address(es). In an embodiment, the RLC context includes the RLC configuration and the UL SDT TNL address(es).

In step 605b (optional), the receiving gNB transmits the UL data, if any, to the anchor gNB. As an alternative or in addition, the receiving gNB receives the DL data from the anchor gNB, if any, and transmits the received DL data to UE.

Note that, both the UL data and DL data are in the PDCP PDU packets. In addition, the UL data includes buffered UL data (e.g. that receiving in step 601, if any) and/or subsequence UL data received from UE after step 604b.

In step 606b, if the receiving gNB receives the Retrieve UE Context Response message from the anchor gNB, step 604a is performed. In addition, if the receiving gNB receives the Retrieve UE Context Failure message, step 607b is performed.

In step 607b (optional), the receiving gNB receives subsequent UL data, if any, from the UE and transmits the received subsequent UL data to the UPF. As an alternative or in addition, the receiving gNB receives subsequence DL data, if any, from the anchor gNB and transmits the received subsequent DL data to the UE.

Note that, the UL data from the UE is in UL PDU packets and the UL data to UPF is in UL PDCP PDU packets. In addition, the DL data from the anchor gNB is in DL PDCP PDU packets.

In step 608b: the receiving gNB sends the UE to the RRC inactive state or the RRC idle state. The procedure ends after the step 608b.

Figure 6D:
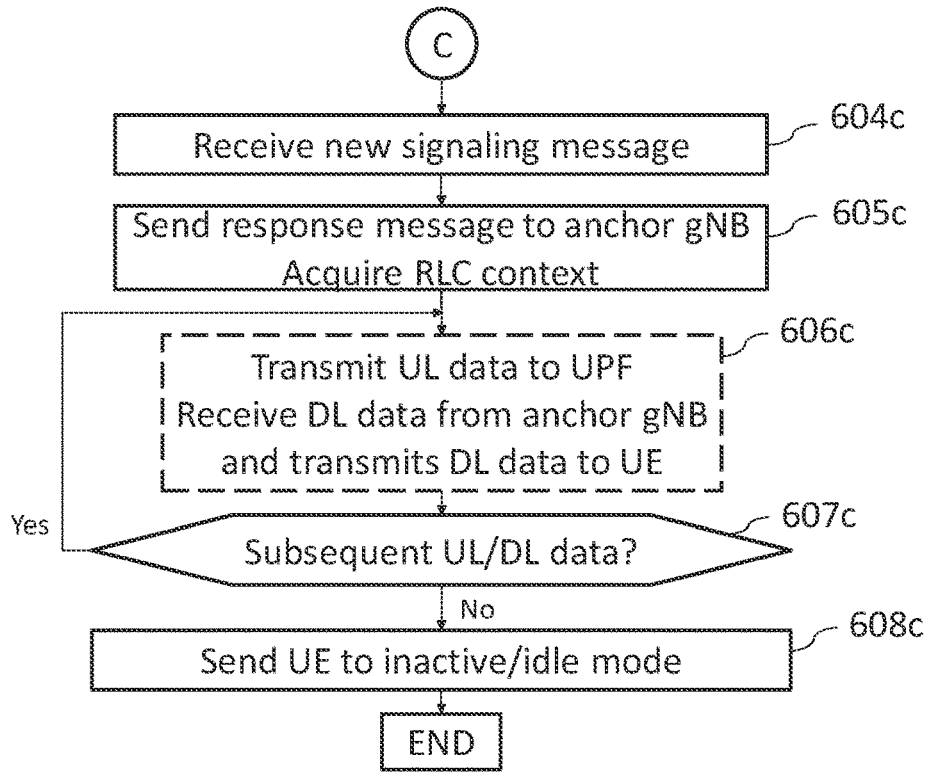

In step 604c of FIG. 6D, the receiving gNB receives the signaling message (i.e. message M1) from the anchor gNB.

In step 605c, the receiving gNB sends the message 2 to the anchor gNB. In addition, the receiving gNB acquires RLC context (at least for the SDT) and establishes RLC entities (at least for the SDT) based on the signaling message, wherein the RLC context includes the RLC configuration and the UL SDT TNL address.

In step 606c, the receiving gNB transmits UL data, if any, to the anchor gNB. As an altermatic or in addition, the receiving gNB receives DL data from the anchor gNB, if any, and transmits the received DL data to the UE. Details of steps 605c and 606c may be referred to those of step 604b and 605b.

In step 607c, the receiving gNB determines whether there is still subsequent UL/DL data. If no, step 608c is performed; otherwise, step 606c is performed.

Step 608c, the receiving gNB sends the UE to the RRC inactive state or the RRC idle state. The procedure ends after this step.

Figure 7A:
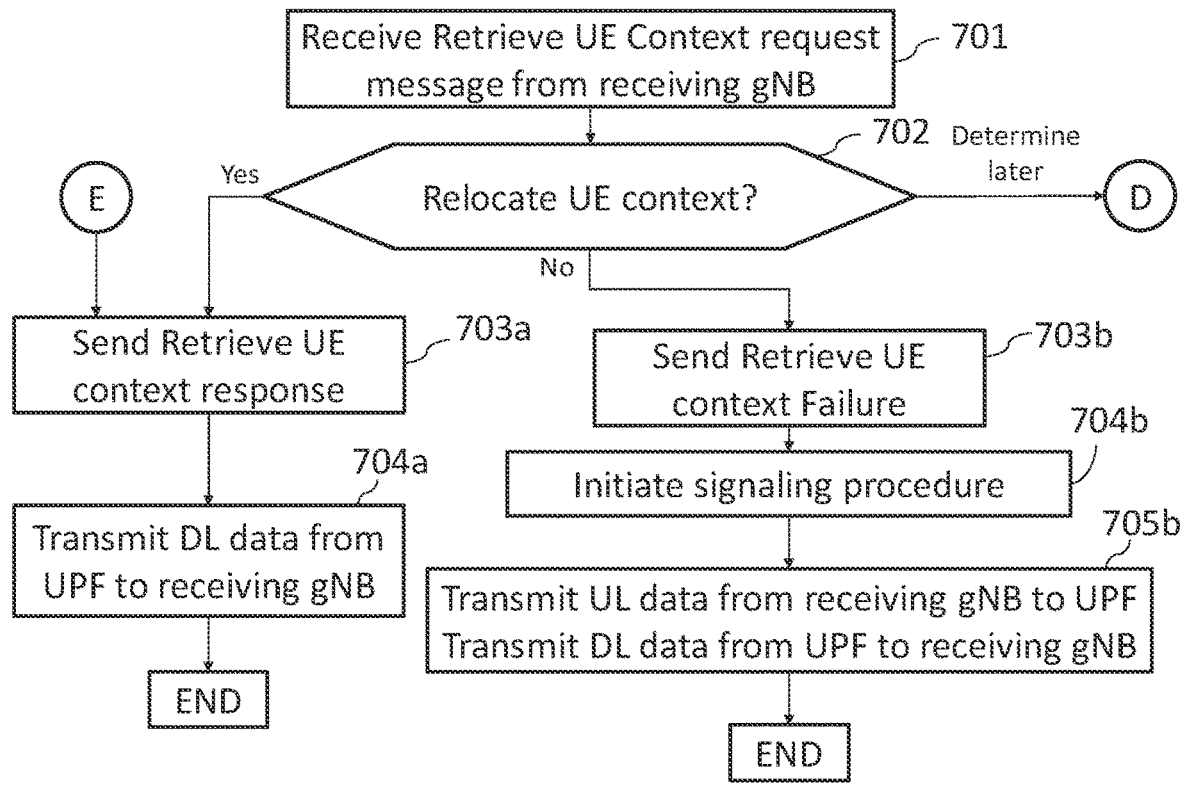
FIGS. 7A and 7B show a flowchart of a resume procedure according to an embodiment of the present disclosure.
Figure 7B:
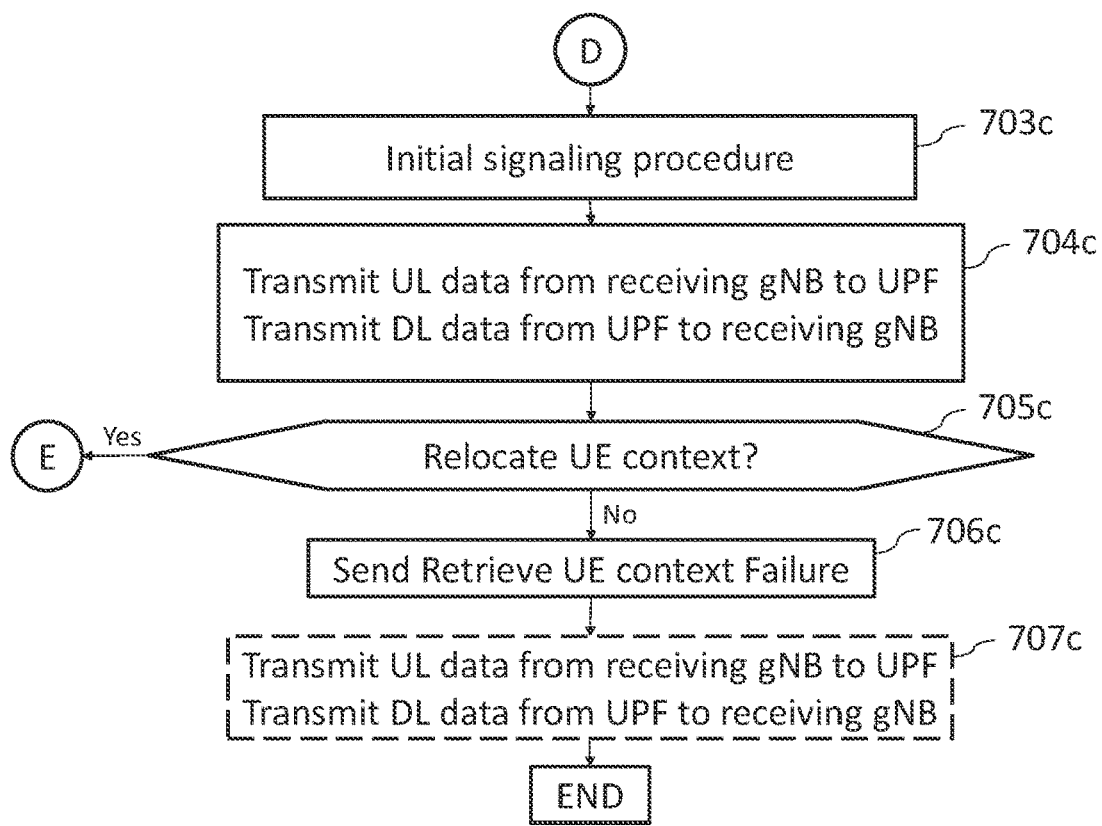

FIGS. 7A and 7B show a flowchart of a resume procedure according to an embodiment of the present disclosure. The procedure shown in FIGS. 7A and 7B may be used in an anchor gNB (e.g. that shown in FIGS. 4A, 4B, 5A and 5B) and comprises the following steps.

In step 701 of FIG. 7A, the anchor gNB receives a Retrieve UE Context request message from the receiving gNB.

In an embodiment, the Retrieve UE Context request message comprises an SDT indicator. As an alternative or in addition, the Retrieve UE Context request message may include an SDT DL CG TNL address.

In step 702, the anchor node decides whether to relocate the UE context. If the anchor node decides to relocate UE context, step 703a is performed; if deciding not to relocate the UE context, step 703b is performed; if having not decided whether to relocate UE context or not (i.e. decide to determine whether to relocate the UE context later), step 703c is performed.

In step 703a, the anchor gNB sends the Retrieve UE Context Response message to the receiving gNB, wherein the Retrieve UE Context Response message includes the UE context. In addition, the Retrieve UE Context Response message may include SDT UL PDCP TNL address.

In step 704a, the anchor gNB may send DL data received from the UPF, if any, to the receiving gNB. Note that, the DL data received from the UPF is in PDU packets and the DL data sent to receiving gNB is in DL PDCP PDU packets. The procedure ends after step 704a.

In step 703b of FIG. 7A, the anchor gNB sends the Retrieve UE Context Failure message to the receiving gNB, wherein the Retrieve UE Context Failure message includes an RRC release message.

In step 704b, the anchor gNB initiates the signaling procedure with receiving gNB. That is, the anchor gNB sends the message M1 to the receiving gNB and receives the message 2 from receiving gNB.

In step 705b, the anchor gNB receives UL data (i.e., PDCP PDU packets) from the receiving gNB, if any, and transmits the received UL data (i.e., PDU packets) to the UPF. As an alternative or in addition, the anchor gNB sends DL data (i.e., PDU packets) received from the UPF, if any, and transmits the DL data (i.e., PDCP PDU packets) to the receiving gNB. The procedure ends after step 705b.

In step 703c of FIG. 7B, the anchor node initiates the signaling procedure with the receiving gNB. In this embodiment, the signaling procedure comprises sending the message M1 to the receiving gNB and receive the message M2 from the receiving gNB.

In step 704c, the anchor gNB receives UL data (i.e., PDCP PDU packets) from the receiving gNB, if any, and transmits the received UL data (i.e., PDU packets) to the UPF. As an alternative or in addition, the anchor gNB sends DL data (i.e., PDU packets) received from the UPF, if any, and transmits the DL data (i.e., PDCP PDU packets) to the receiving gNB.

In step 705c, the anchor node decides whether to relocate the UE context again. If yes, step 703a is performed. Note that, in this scenario, step 704a may be omitted if there is not remaining DL data from the UPF. When the anchor node decides not to relocate the UE context, step 706c is performed. As an alternative or in addition, the anchor node determines whether to relocate the UE context in an even later stage in step 705c, step 704c is performed.

In step 706c, the anchor gNB sends the Retrieve UE Context failure message to the receiving gNB, wherein the Retrieve UE Context failure message includes the RRC release message.

In step 707c (Optional), the anchor node receives UL data from the receiving gNB, if any, and transmits the UL data to the UPF. As an alternative or in addition, the anchor gNB sends DL data received from the UPF, if any, and transmits the DL data to the receiving gNB. The procedure ends after step 707c.

In an embodiment, after receiving the Retrieve UE Context request message including a new Cause (e.g. SDT indicator), the anchor node may decide whether to relocate UE context. If the anchor node decides not to relocate UE context or to determine whether to relocate the UE context in a later stage, the anchor node initiates the signaling procedure with the receiving node.

Through this signaling procedure, the receiving node acquires SDT RLC configuration and SDT UL PDCP TNL address for the SDT, establishes the SDT RLC entities and sends SDT DL CG TNL address to the anchor node. After this signaling procedure, the receiving node is able to transmit SDT UL data (i.e., PDCP PDU packets) to the anchor node.

On the other hand, via this signaling procedure, the anchor node acquires SDT DL CG TNL address and sends SDT UL PDCP TNL address to the receiving node. After this signaling procedure, the anchor node is able to transmit SDT DL data (i.e., PDCP PDU packets) to the receiving node.

As a result, the small data is transmitted to the network as quick as possible and the latency of the SDT is reduced.

Figure 8:
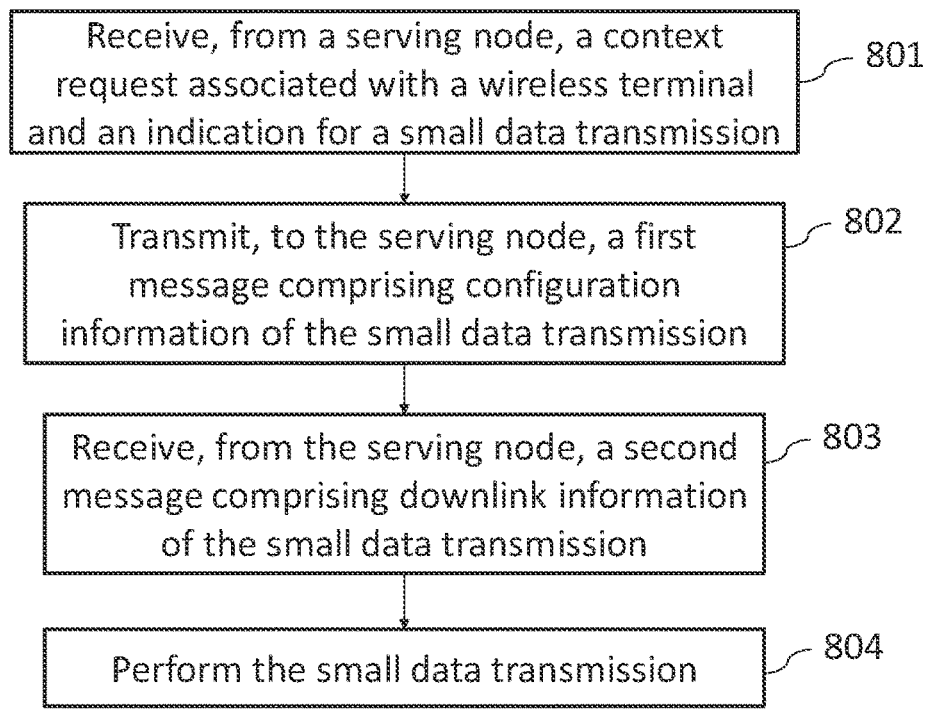
FIG. 8 shows a flowchart of a process according to an embodiment of the present disclosure.

FIG. 8 shows a flowchart of a process according to an embodiment of the present disclosure. The process may be used in an anchor node (e.g. anchor gNB or last serving gNB) and comprises the following steps:

Step 801: Receive, from a serving node, a context request associated with a wireless terminal and an indication for a small data transmission.

Step 802: Transmit, to the serving node, a first message comprising configuration information of the small data transmission.

Step 803: Receive, from the serving node, a second message comprising downlink information of the small data transmission.

Step 804: Perform the small data transmission.

In the process shown in FIG. 8, the anchor node performs the signaling procedure after receiving the context request (message) associated with a wireless terminal (i.e. UE) and an indication of the SDT (e.g. cause value indicating the SDT or an SDT indicator) from the serving node. The signaling procedure comprises transmitting a first message (e.g. message M1) comprising configuration information of the SDT to the serving node and receiving a second message (e.g. message M2) comprising DL information (e.g. DL address) of the SDT from the serving node. After the signaling procedure completes, the anchor node performs the SDT.

Note that, the SDT is the data transmission allowed to be performed for transmitting/receiving small data for the UE in the inactive state.

In an embodiment, the first message is transmitted, and the second message is received no later than transmitting a response message in response to the resume request. That is, the anchor node may not able to determine whether to relocate the UE context (e.g. based on current information) and/or may determine whether to relocate the UE context in a later stage. Or, the anchor node determines not to relocate the UE context in the later stage. In this embodiment, the response message comprises one of context information (i.e. UE context) of the wireless terminal (i.e. Retrieve UE Context Response message) or an RRC release message (i.e. Retrieve UE Context Failure message).

In an embodiment, the first message is transmitted, and the second message is received after transmitting a response message in response to the resume request, wherein the response message comprises an RRC release message (i.e. Retrieve UE Context Failure message).

In an embodiment, the configuration information comprises at least one of a UL address of the small data transmission (e.g. UL TNL address) or an RLC configuration of the SDT.

In an embodiment, the downlink information comprises a DL CG TNL address.

In an embodiment, the SDT comprises receiving, from a UPF, DL data of the wireless terminal, and transmitting, to the serving node, the downlink data.

In an embodiment, the SDT comprises receiving, from the serving node, UL data of the wireless terminal, and transmitting, to a UPF, the UL data.

Note that, the UL/DL data is small data for the SDT which is allowed to be transmitted/received by the UE in the inactive state (e.g. RRC INACTIVE).

Figure 9:
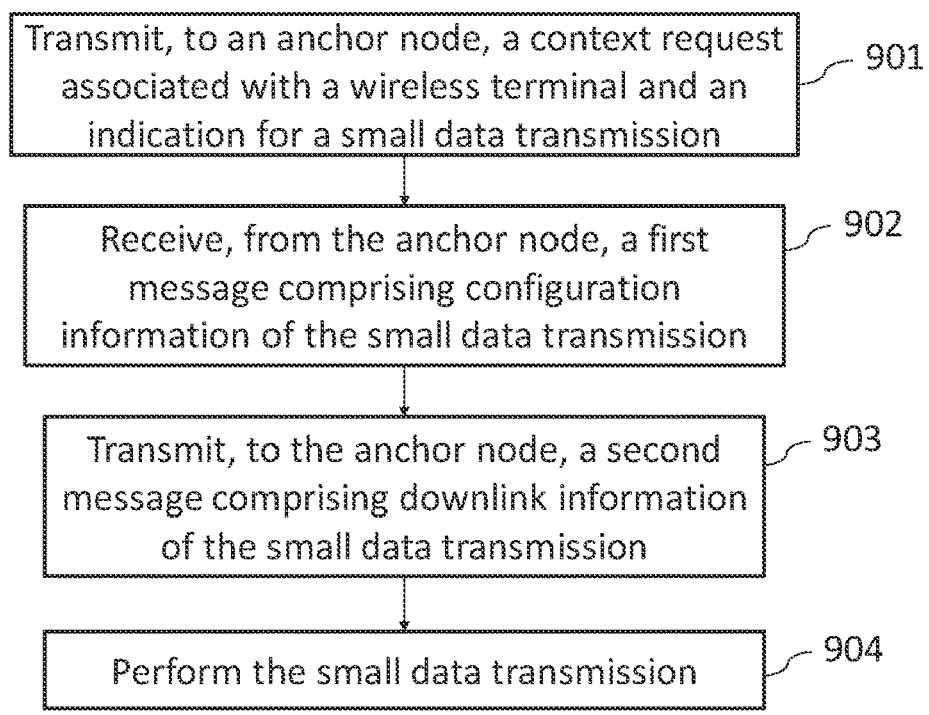
FIG. 9 shows a flowchart of a process according to an embodiment of the present disclosure.

FIG. 9 shows a flowchart of a process according to an embodiment of the present disclosure. The process may be used in a serving node (e.g. receiving gNB) and comprises the following steps:

Step 901: Transmit, to an anchor node, a context request associated with a wireless terminal and an indication for a small data transmission.

Step 902: Receive, from the anchor node, a first message comprising configuration information of the small data transmission.

Step 903: Transmit, to the anchor node, a second message comprising downlink information of the small data transmission.

Step 904: Perform the small data transmission.

In FIG. 9, the serving node transmits a context request message associated with a wireless terminal and an indication for an SDT to the anchor node. For example, the receiving node may receive a resume request from the wireless terminal, determine possible anchor nodes and transmits the context request message to all possible anchor nodes. After transmitting the context request message, the serving node may receive a first message (e.g. message M1) comprising configuration information of the SDT and transmits a second message (e.g. message M2) comprising DL information of the SDT. Next, the serving node is able to perform the SDT, if there is UL/DL data for the SDT.

In an embodiment, the first message is received and the second message is transmitted no later than receiving a response message in response to the resume request. That is, the first message is received and the second message is transmitted before acknowledging that whether anchor relocation is needed. In this embodiment, the response message comprises one of context information (i.e. UE context) of the wireless terminal (i.e. Retrieve UE Context Response message) or an RRC release message (i.e. Retrieve UE Context Failure message).

In an embodiment, the first message is received and the second message is transmitted after receiving a response message in response to the resume request, wherein the response message comprises an RRC release message (i.e. Retrieve UE Context Failure message).

In an embodiment, the configuration information comprises at least one of a UL address of the SDT or an RLC configuration of the SDT.

In an embodiment, the configuration information comprises at least one of a UL address of the small data transmission (e.g. UL TNL address) or an RLC configuration of the SDT.

In an embodiment, the DL information comprises a DL CG TNL address.

In an embodiment, the serving node establishes RLC entities for the SDT based on the configuration information and determines (e.g. acquires, accesses) an UL address of the SDT based on the configuration information.

In an embodiment, the SDT comprises receiving, from the anchor node, DL data of the wireless terminal, and transmitting, to the wireless terminal, the DL data.

In an embodiment, the SDT comprises receiving, from the wireless terminal, UL data, and transmitting, to the anchor node, the UL data.

Note that, the UL data may be received from the wireless terminal before step 904 (e.g. in step 901).

Figure 10:
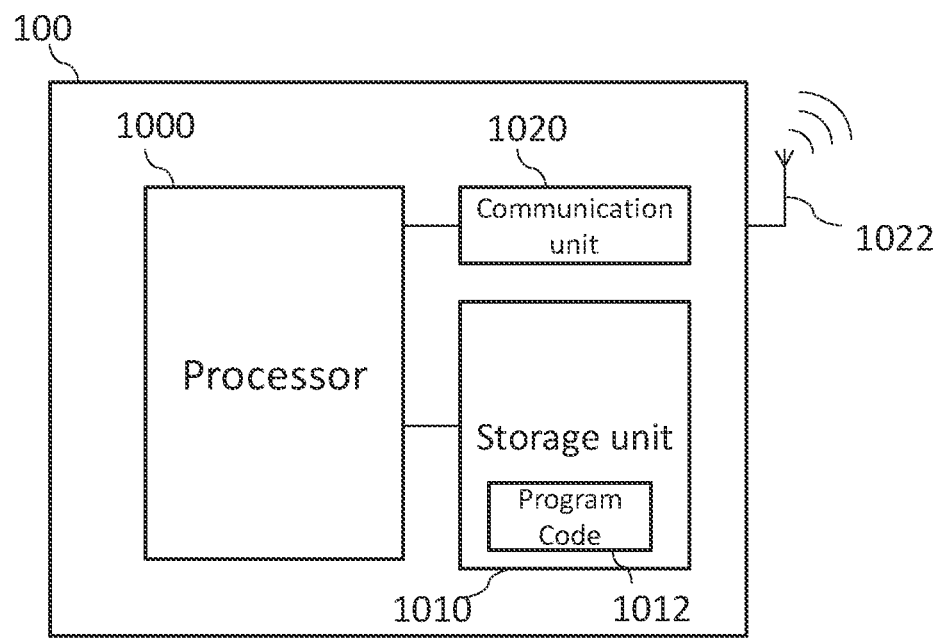
FIG. 10 shows an example of a schematic diagram of a wireless terminal according to an embodiment of the present disclosure.

FIG. 10 relates to a schematic diagram of a wireless terminal 100 according to an embodiment of the present disclosure. The wireless terminal 100 may be a user equipment (UE), a mobile phone, a laptop, a tablet computer, an electronic book or a portable computer system and is not limited herein. The wireless terminal 100 may include a processor 1000 such as a microprocessor or Application Specific Integrated Circuit (ASIC), a storage unit 1010 and a communication unit 1020. The storage unit 1010 may be any data storage device that stores a program code 1012, which is accessed and executed by the processor 1000. Embodiments of the storage unit 1012 include but are not limited to a subscriber identity module (SIM), read-only memory (ROM), flash memory, random-access memory (RAM), hard-disk, and optical data storage device. The communication unit 1020 may a transceiver and is used to transmit and receive signals (e.g. messages or packets) according to processing results of the processor 1000. In an embodiment, the communication unit 1020 transmits and receives the signals via at least one antenna 1022 shown in FIG. 10.

In an embodiment, the storage unit 1010 and the program code 1012 may be omitted and the processor 1000 may include a storage unit with stored program code.

The processor 1000 may implement any one of the steps in exemplified embodiments on the wireless terminal 100, e.g., by executing the program code 1012.

The communication unit 1020 may be a transceiver. The communication unit 1020 may as an alternative or in addition be combining a transmitting unit and a receiving unit configured to transmit and to receive, respectively, signals to and from a wireless network node (e.g. a base station).

Figure 11:
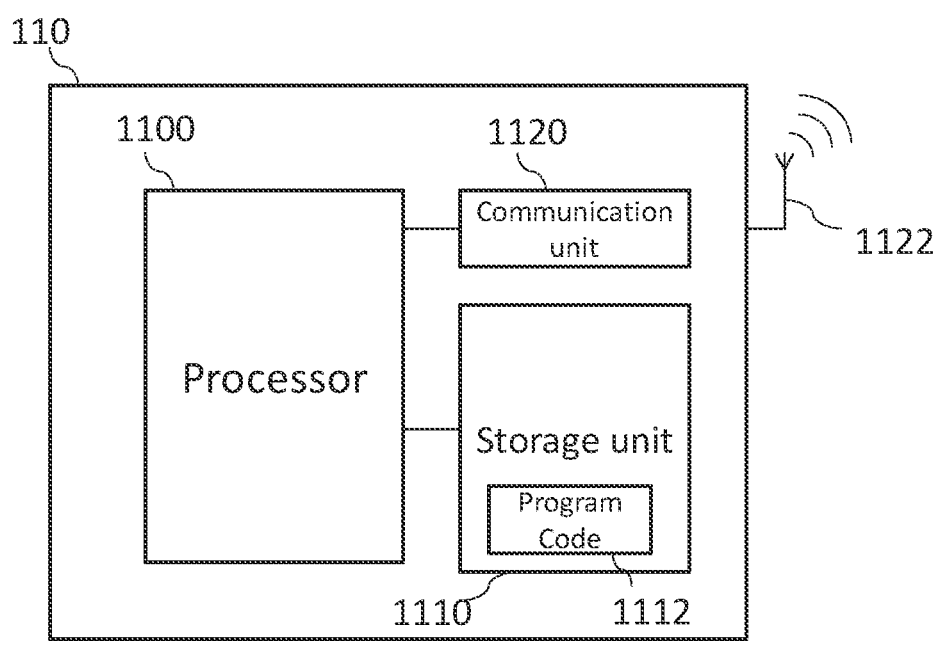
FIG. 11 shows an example of a schematic diagram of a wireless network node according to an embodiment of the present disclosure.

FIG. 11 relates to a schematic diagram of a wireless network node 110 according to an embodiment of the present disclosure. The wireless network node 110 may be a satellite, a base station (BS), a network entity, a Mobility Management Entity (MME), Serving Gateway (S-GW), Packet Data Network (PDN) Gateway (P-GW), a radio access network (RAN) node, a next generation RAN (NG-RAN), an eNB, an NG-eNB, a gNB, a data network, a core network or a Radio Network Controller (RNC), and is not limited herein. In addition, the wireless network node 110 may comprise (perform) at least one network function such as an access and mobility management function (AMF), a session management function (SMF), a user place function (UPF), a policy control function (PCF), an application function (AF), etc. The wireless network node 110 may include a processor 1100 such as a microprocessor or ASIC, a storage unit 1110 and a communication unit 1120. The storage unit 1110 may be any data storage device that stores a program code 1112, which is accessed and executed by the processor 1100. Examples of the storage unit 1112 include but are not limited to a SIM, ROM, flash memory, RAM, hard-disk, and optical data storage device. The communication unit 1120 may be a transceiver and is used to transmit and receive signals (e.g. messages or packets) according to processing results of the processor 1100. In an example, the communication unit 1120 transmits and receives the signals via at least one antenna 1122 shown in FIG. 11.

In an embodiment, the storage unit 1110 and the program code 1112 may be omitted. The processor 1100 may include a storage unit with stored program code.

The processor 1100 may implement any steps described in exemplified embodiments on the wireless network node 110, e.g., via executing the program code 1112.

The communication unit 1120 may be a transceiver. The communication unit 1120 may as an alternative or in addition be combining a transmitting unit and a receiving unit configured to transmit and to receive, respectively, signals to and from a wireless terminal (e.g. a user equipment).

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand example features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any one of the above-described example embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any one of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any one of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method for use in an anchor node, the method comprising:
   receiving, from a serving node, a context request associated with a wireless terminal and an indication for a small data transmission,
   transmitting, to the serving node, a first message comprising configuration information of the small data transmission,
   receiving, from the serving node, a second message comprising downlink information of the small data transmission, and
   performing the small data transmission.

2. The wireless communication method of claim 1, wherein the first message is transmitted and the second message is received no later than transmitting a response message in response to a resume request.

3. The wireless communication method of claim 2, wherein the response message comprises a radio resource control release message.

4. The wireless communication method of claim 1, wherein the configuration information comprises at least one of an uplink address of the small data transmission or a radio link control configuration of the small data transmission.

5. The wireless communication method of claim 1, wherein the downlink information comprises a downlink cell group transport network layer address.

6. A wireless communication method for use in a serving node, the method comprising:
   transmitting, to an anchor node, a context request associated with a wireless terminal and an indication for a small data transmission,
   receiving, from the anchor node, a first message comprising configuration information of the small data transmission,
   transmitting, to the anchor node, a second message comprising downlink information of the small data transmission, and
   performing the small data transmission.

7. The wireless communication method of claim 6, wherein the first message is received and the second message is transmitted no later than receiving a response message in response to a resume request.

8. The wireless communication method of claim 7, wherein the response message comprises a radio resource control release message.

9. The wireless communication method of claim 6, wherein the configuration information comprises at least one of an uplink address of the small data transmission or a radio link control configuration of the small data transmission.

10. The wireless communication method of claim 6, wherein the downlink information comprises a downlink cell group transport network layer address.

11. The wireless communication method of claim 6, further comprising:
    establishing radio link control entities for the small data transmission based on the configuration information.

12. An anchor node, comprising:
    a communication unit, configured to:
       receive, from a serving node, a context request associated with a wireless terminal and an indication for a small data transmission,
       transmit, to the serving node, a first message comprising configuration information of the small data transmission, and
       receive, from the serving node, a second message comprising downlink information of the small data transmission, and
    a processor, configured to perform the small data transmission.

13. The anchor node of claim 12, wherein the first message is transmitted and the second message is received no later than transmitting a response message in response to a resume request.

14. The anchor node of claim 13, wherein the response message comprises a radio resource control release message.

15. The anchor node of claim 12, wherein the configuration information comprises at least one of an uplink address of the small data transmission or a radio link control configuration of the small data transmission.

16. The anchor node of claim 12, wherein the downlink information comprises a downlink cell group transport network layer address.

17. A serving node, comprising:
    a communication unit, configured to:
       transmit, to an anchor node, a context request associated with a wireless terminal and an indication for a small data transmission,
       receive, from the anchor node, a first message comprising configuration information of the small data transmission, and
       transmit, to the anchor node, a second message comprising downlink information of the small data transmission, and
    a processor, configured to perform the small data transmission.

18. The serving node of claim 17, wherein the first message is received and the second message is transmitted no later than receiving a response message in response to a resume request.

19. The serving node of claim 18, wherein the response message comprises a radio resource control release message.

20. The serving node of claim 17, wherein the processor is further configured to establish radio link control entities for the small data transmission based on the configuration information.

* * * * *